United States Patent
Stimpson et al.

(10) Patent No.: US 12,513,607 B2
(45) Date of Patent: Dec. 30, 2025

(54) METHODS FOR PROVIDING CONSISTENT AND RELIABLE CONNECTIVITY TO A FLEET OF USER EQUIPMENTS AND RELATED SYSTEMS

(71) Applicant: Relay, Inc., Raleigh, NC (US)

(72) Inventors: Jesse Stimpson, Fuquay-Varina, NC (US); Scott Hiller, Raleigh, NC (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 18/751,499

(22) Filed: Jun. 24, 2024

(65) Prior Publication Data

US 2025/0392980 A1 Dec. 25, 2025

(51) Int. Cl.
*H04W 48/16* (2009.01)
(52) U.S. Cl.
CPC .................................. *H04W 48/16* (2013.01)
(58) Field of Classification Search
CPC ............................. H04W 48/16; H04W 76/27
USPC ........................................................ 455/434
See application file for complete search history.

(56) References Cited

U.S. PATENT DOCUMENTS 11,844,013 B1 * 12/2023 Shahid .................. H04W 16/14

* cited by examiner

*Primary Examiner* — Chuck Huynh
(74) *Attorney, Agent, or Firm* — Gregory Stephens (57) ABSTRACT

Methods for managing a plurality of user equipments (UEs) are provided, wherein the UEs are part of a system communicable with a communication platform server (CPS) via one of a plurality of wireless service providers communicable with an Internet Protocol (IP) network, the UEs configured to transmit connectivity data associated with locations within a designated coverage area. The method includes receiving, at the CPS, connectivity data associated with two or more wireless service providers from each of a plurality of UEs operational in a designated coverage area, the connectivity data being associated with a location of each of the plurality of UEs within the designated coverage area. A unique connectivity score that indicates a quality of service provided by each of the two or more wireless service providers is determined based on the connectivity data received from each of the plurality of UEs. At least one of the two or more wireless service providers is selected as a default wireless service provider for the plurality of UEs in the designated coverage area based on the determined unique connectivity scores.

27 Claims, 4 Drawing Sheets

METHODS FOR PROVIDING CONSISTENT AND RELIABLE CONNECTIVITY TO A FLEET OF USER EQUIPMENTS AND RELATED SYSTEMS

FIELD

The present disclosure generally relates to fleet management systems and, more particularly, to methods and systems for generating connectivity data and utilizing the same to provide improved connectivity to designated coverage areas.

BACKGROUND

In various industries, electronic devices are used to support operations. These electronic devices can include communication tools, portable sensors, tracking units, dedicated team coordination devices, or the like. For example, electronic devices such as the Relay X™ by Relay, Inc. in Raleigh, NC, offer features like two-way radio capabilities over multiple RF interfaces, location tracking, messaging, and voice commands, facilitating team coordination and efficient workflow management. As the number of electronic devices within an organization grows, managing this fleet of devices becomes increasingly complex. Ensuring that each device can adequately and consistently connect to a cellular RF network so that these devices can reliably send and/or receive communications can be challenging. A reliable cellular RF network connection allows these devices to be used to communicate with a communication platform server (CPS), with one another via the CPS, communicate the current location of the device, to monitor other devices, provide alerts related to the fleet, track a current state of a device such as battery level, last known location, and user assignment and the like. Without accurate and timely information, administrators may struggle to maintain device readiness and ensure that all units are accounted for and working properly. Thus, maintaining connectivity between the CPS and these user devices is important.

SUMMARY

Some embodiments of the present inventive concept provide methods for managing a plurality of user equipments (UEs), wherein the UEs are part of a system communicable with a communication platform server (CPS) via one of a plurality of wireless service providers communicable with an Internet Protocol (IP) network, the UEs configured to transmit connectivity data associated with locations within a designated coverage area. The method includes receiving, at the CPS, connectivity data associated with two or more wireless service providers from each of a plurality of UEs operational in a designated coverage area, the connectivity data being associated with a location of each of the plurality of UEs within the designated coverage area. A unique connectivity score that indicates a quality of service provided by each of the two or more wireless service providers is determined based on the connectivity data received from each of the plurality of UEs. At least one of the two or more wireless service providers is selected as a default wireless service provider for the plurality of UEs in the designated coverage area based on the determined unique connectivity scores.

In further embodiments, the system may further include a plurality of mobile virtual network enablers (MVNEs). Access to the two or more wireless service providers may be enabled using the plurality of MVNEs. The method may further include determining a unique connectivity score indicating the quality of service provided by each of the plurality of MVNEs based on the connectivity data received from each of the plurality of UEs. At least one of the plurality of MVNEs may be selected as a default MVNE for the plurality of UEs in the designated coverage area based on the determined unique connectivity scores.

In still further embodiments, a single MVNE having a best unique connectivity score may be selected to provide wireless service to all of the plurality of UEs in the designated coverage area.

In some embodiments, the designated coverage area may be divided into a plurality of sections. The method may further include selecting different MVNEs to provide wireless service in each of the plurality of sections of the designated coverage area based on the unique connectivity score of each of the MVNEs in the each of the plurality of sections.

In further embodiments, each of the plurality of UEs may be multi-modal and may be configured to operate with more than one wireless service provider.

In still further embodiments, an MVNE may be selected for at least some of the plurality of UEs in real time based on the unique connectivity score of the plurality of MVNEs.

In some embodiments, the connectivity data may include at least an amount of time it takes for a UE to connect to the network and a delay in connecting the UE to the network.

In further embodiments, the method may further include periodically determining the unique connectivity scores for each of the plurality of MVNEs based on the connectivity data periodically received from each of the plurality of UEs. The selected at least one MVNE set as the default wireless service provider for the plurality of UEs in the designated coverage area may be switched to a different MVNE when the unique connectivity score associated with the selected MVNE is determined to be worse than the unique connectivity score associated with different MVNE.

In still further embodiments, the method may further include storing environmental layout data for a collection of wireless communication nodes deployed throughout the designated coverage area, wherein the environmental layout data comprises information that uniquely identifies each wireless communication node and associates each wireless communication node with a distinct location within the designated coverage area. The unique connectivity score indicating the quality of service provided by each of the plurality of MVNEs may be stored for each of the distinct locations within the designated coverage area.

Related systems and non-transitory computer-readable medium embodiments are also provided.

BRIEF DESCRIPTION OF THE DRAWINGS

Throughout the drawings, reference numbers can be re-used to indicate correspondence between referenced elements. The drawings are provided to illustrate embodiments of the present disclosure and do not limit the scope thereof.

DETAILED DESCRIPTION

Managing fleets of user equipment (UEs) is an important aspect in various industries, enhancing the coordination and operational efficiency of organizations. A critical aspect of fleet management and operations is connectivity. For instance, the UEs may be wireless multi-modal portable communication devices may be capable of and configured for communicating over cellular, WiFi, and other RF network interfaces. In such a system, each UE can communicate with other UEs via a centralized cloud-based communication platform server (CPS). Thus, each message sent from one UE to one or more other UEs is brokered by the CPS. Maintaining connectivity between each UE and the CPS is paramount. Moreover, many functions may only require communication between a single UE and the CPS further stressing the need for reliable connectivity between the UE and the CPS.

Typically, a UE will default to WiFi connectivity for wireless communication to a wireless access point that can then route message traffic to the cloud-based CPS over, for instance, a packet data network such as the Internet. When WiFi connectivity is unavailable or insufficient, the UE may default to cellular connectivity. Each UE may be equipped with a cellular RF modem capable of communicating with a plurality of wireless mobile service providers.

The inventive concepts described herein improve the process of managing UEs within a fleet by monitoring connectivity of the UEs to collect data associated with connectivity and managing the connectivity thereof based on the collected data. For example, each UE can send signals to available networks, for example, cell or Wifi networks, to obtain data related to the connectivity thereof and provide this data to a server, for example, a communication platform server (CPS), to be analyzed. The CPS can maintain an accurate record of each UE's connectivity and use this data to provide the overall best connectivity for the fleet.

Some inventive concepts described herein represent a notable improvement in the field of fleet management, particularly, by improving connectivity of UEs in the fleet. As will be discussed herein, a customer is generally assigned an account, where each account has a set or fleet of UEs associated therewith. The number of UEs associated with an account may vary broadly, for example, from ten units to thousands of units. Each customer account also generally has a physical location associated therewith in which the UEs are primarily used. UEs within this physical location, for example, a building or small campus, may perform better on some networks as opposed to others. UEs discussed herein are multi-modal. In other words, among other things, multiple subscriber identity module (SIM) profiles may be associated with each UE making the UE capable of using multiple cellular providers for connectivity.

In some embodiments, cellular connectivity may occur through access to mobile virtual network enablers (MVNEs) including, but not limited to, GigSky, Twilio, Kore, Syniverse and the like. SIM cards for these MVNEs are used to access mobile network operators (MNOs), such as Verizon and AT&T. Thus, if each UE includes two or more SIM cards, the UE can use any one of the providers that correspond to the SIM cards. It will be understood that these MVNEs and MNOs are provided as examples only and embodiments of the present inventive concept are not limited thereto.

The quality of service (QOS) provided by each MVNE to MVNE may vary widely regardless of cell provider even if separate MVNEs utilize the same MNO. In some embodiments, connection quality may be measured based on the time it takes a network to get up and running (connection uptime) and the network delay (latency). Connection (network) uptime, may be tracked and measured by calculating the ratio of uptime to downtime across, for example, 365 days, which may then be expressed as a percentage. Services that achieve uptimes in the range of, for example, 99 percent or above can be considered as having good connection time. To achieve 99 percent the network must be connected (up) 361.35 days per year. Network latency is the delay in network communication. Latency shows the time that data takes to transfer across the network. Networks with a longer delay or lag are said to have "high latency," while those with fast response times are said to have "low latency."

The server, or CPS, may implement an algorithm that sends "scouts," for example, UEs having a scout application thereon, to ping available cellular networks for a given account (customer) at the location where the UEs are used. The data gathered by the scout UEs can be used cooperatively to decide the best overall cell service provider based on network performance information. Over time, data pertaining to the quality of the network performance of the UEs when connected to the CPS via the various MVNEs can be obtained as will be discussed further herein.

The data acquired by the scout UEs may be used by the algorithm to "score" each MVNE's cellular connectivity. More particularly, the data acquired and the score associated may be positionally linked based on the location associated with each data point. In other words, using the data, a score may be assigned to each MVNE and this score may be used in the selection process. In some embodiments, the MVNE that scores best overall at a particular location may be set as the default cellular MVNE for the entire fleet at that location. In further embodiments, rather than assign the entire fleet to the same MVNE, some UEs may be assigned to a different MVNE. For example, certain sections within a larger account location footprint may exhibit characteristics that show that one MVNE gets better results in a section of the location than another MVNE. In such scenarios, individual UEs in that section may be switched to a different MVNE. This granular data may be linked to location provided by a set of, for example, Bluetooth beacons, in known locations.

Most any location in which a fleet of UEs are deployed is likely to experience connectivity issues in certain areas, i.e. there will likely be dead spots for wireless fidelity (WiFi) and/or cell connectivity. The fleet of UEs associated with an account can be used to identify when and where a UE device in the account location had connectivity issues. The UEs may track indoor location changes using, for example, Bluetooth beacons, and report data back to the CPS including data related to message failure rates and offline duration. Layering this connectivity data on top of indoor locations is insightful to areas that have poor connectivity and, thus, negatively impact product usage. This data may then be used to identify problem areas that could be candidates for enhanced coverage. Enhanced coverage may include, for example, additional access points. Details with respect to embodiments discussed herein will be discussed below with respect to the figures.

Figure 1:
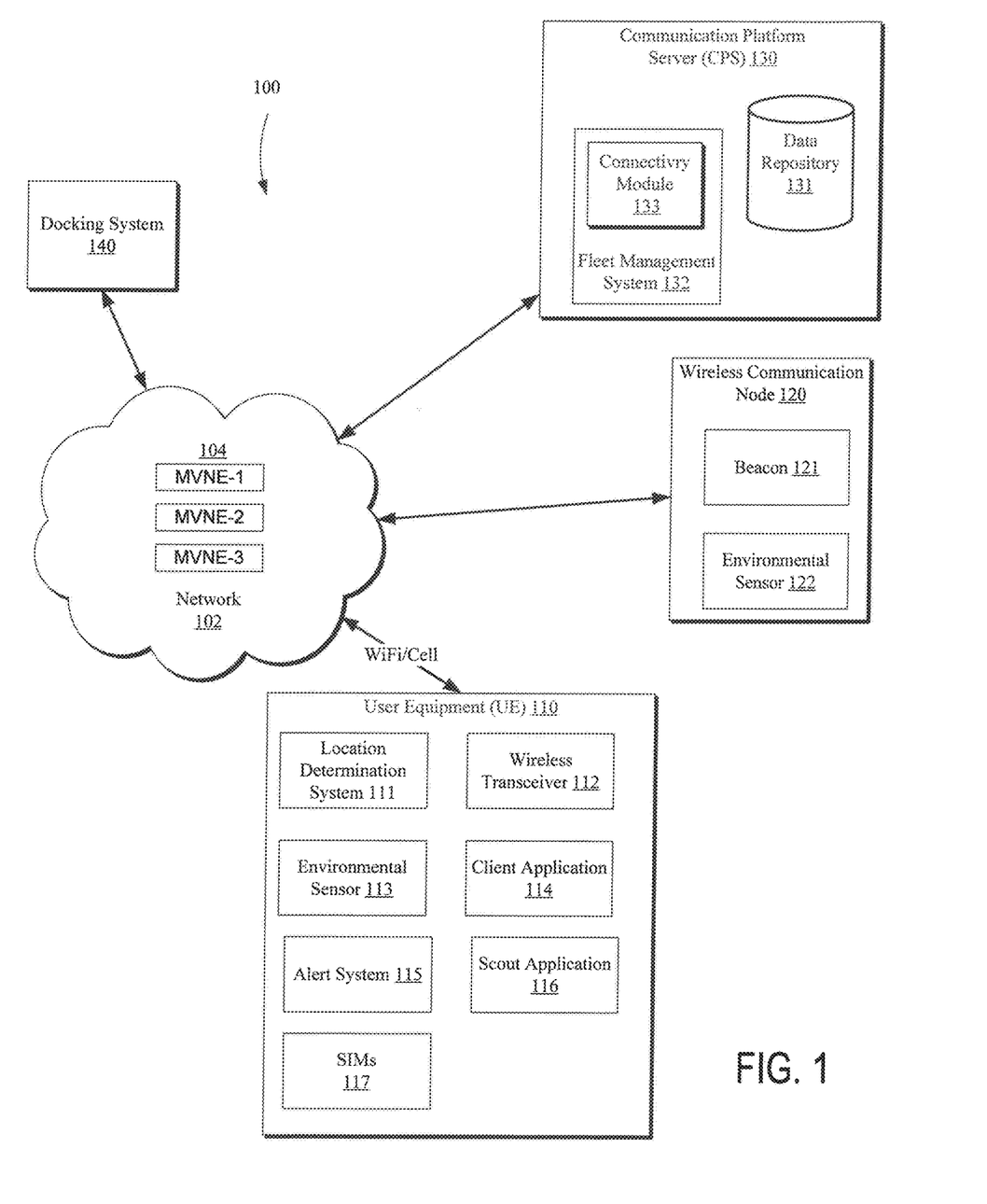
FIG. 1 is a block diagram illustrating a system including a fleet of user equipments associated with an account having a designated coverage area in accordance with some embodiments of the present inventive concept.

FIG. 1 illustrates a block diagram of a device management system 100 for monitoring and managing the user equipment (UE) 110 within designated coverage areas. The device management system 100 includes the UE 110, a wireless communication node 120, a communication platform server (CPS) 130, and a docking system 140. To simplify discussion and not to limit the present disclosure, FIG. 1 illustrates only one UE 110, wireless communication node 120, CPS 130, and docking system 140, though multiple may be used.

Any of the foregoing components or systems of the device management system 100 may communicate via the network 102. Although only one network 102 is illustrated, multiple distinct and/or distributed networks 102 may exist. The network 102 can include any type of communication network, including RF (Radio Frequency) communication. For example, the network 102 can include, but is not limited to, local area networks (LAN), wide area networks (WAN), cellular networks such as 4G LTE, 5G, HSPA, and 3G, Bluetooth and Bluetooth Low Energy (BLE) protocols, ad hoc networks, satellite networks, wired networks, or wireless networks, such as Internet Protocol (IP) networks. In some embodiments, the network 102 can include the Internet.

As further illustrated in FIG. 1, the network 102 may include one or more MVNEs, MVNE-1, MVNE-2, MVNE-3, referred to collectively as MVNEs 104. Connectivity may occur through access to MVNEs 104 such as, for example, GigSky, Twilio, Syniverse and the like. SIM cards 117 for these MVNEs 104 positioned in the UEs are used to access mobile network operators (MNOs), such as Verizon and AT&T. Thus, if each UE 110 includes two or more SIM cards 117, each UE 110 can use any one of the providers that correspond to the SIM cards. Thus, the UEs are multi-modal. It will be understood that these MVNEs and MNOs are provided as examples only and embodiments of the present inventive concept are not limited thereto.

Any of the foregoing components or systems of the device management system 100, such as any one or any combination of the UE 110, the wireless communication node 120, the CPS 130, or the docking system 140 may be implemented using individual computing devices, processors, distributed processing systems, servers, isolated execution environments (e.g., virtual machines, containers, etc.), shared computing resources, or so on. Furthermore, any of the foregoing components or systems of the device management system 100 may be combined and/or may include software, firmware, hardware, or any combination(s) of software, firmware, or hardware suitable for the purposes described.

The UE 110 can be a portable, handheld tool. For example, the UE 110 can include, but is not limited to, a smartphone, tablet computer, handheld computer, laptop computer, desktop computer, wearable device, server, portable media player, gaming device, or the like. In some cases, the UE 110 is a dedicated team coordination device. For example, the UE 110 can facilitate team coordination through features such as, but not limited to, two-way radio capabilities, location tracking, messaging, or voice commands. An example UE 110 is the RelayX™ by Relay, Inc. in Raleigh, NC.

The UE 110 can be compatible with a client application 114, which may include, but is not limited to, a web browser, a mobile application or "app," a background process that performs various operations with or without direct interaction from a user, or a "plug-in" or "extension" to another application, such as a web browser plug-in or extension. The UE 110 can include a processor configured to execute instructions. The client application 114 can facilitate various communication functions such as real-time messaging, sending alerts, or tracking locations of UE 110 within the network 102. In some cases, the client application 114 can allow administrators or help desk personnel to communicate directly with the UE 110, such as by sending instructions or alerts, or monitoring activities.

The UE 110 can include a location determination system 111 for determining the location of the UE 110. The location determination system 111 can determine the location of the UE 110 based at least in part on receiving and/or analyzing signals from nearby wireless communication devices 120 (e.g., beacons 121) in known fixed locations. As described herein, the beacons 121 can emit RF signals using technologies like Bluetooth Low Energy (BLE). Upon receiving these signals, the UE 110 can analyze signal characteristics. By processing these signals, the UE 110 can perform triangulation or other proximity analysis to estimate its approximate location within the designated coverage area. This analysis can facilitate an accurate determination of the relative or absolute position of the UE 110 with the designated coverage area. In addition, GPS may be used when the designated coverage area spans a larger footprint such as, for instance, a college campus or the like. When put into context with the knowledge of the fixed location(s) of the beacons 121, the UE 110 can accurately locate itself using environmental layout data of the designated coverage area.

As described herein, the plurality of RF beacons 121 can be placed around an area to define a geo-fence boundary for the UEs 110. In some cases, the specific location of each RF beacon 121 is known to the CPS and/or the UE 110. In some cases, the UE 110 can utilize these known geofences to determine whether it is within a compliance zone or a non-compliance zone. Upon detecting non-compliance events, the UE 110 can trigger alerts or notifications to inform users or administrators, thereby helping to maintain device accountability and operational efficiency within the fleet management system.

The location determination may be performed by the UE 110 itself, rather than the CPS 130, and the UE 110 can communicate updates to the CPS 130 with its location. Since communicating location updates involves activating a wireless transceiver 112, which consumes power, it can be battery intensive. Additionally, frequent data transmissions utilize bandwidth and increase data usage. By conducting the analysis internally on the UE 110, the UE 110 conserves battery life and reduces data usage by limiting communication with the CPS 130 to updates only. This approach decreases the frequency of communications by the UE 110, thereby conserving battery life and reducing overall data consumption.

In some cases, the UE 110 can include an environmental sensor 113, for example to measure any of various parameters including, but not limited to, barometric pressure, temperature, humidity, light, sound levels, air quality, or electromagnetic field (EMF) strength. In some such cases, the UE 110 can determine or confirm a location determination by utilizing environmental data from its own environmental sensor 113 and the environmental sensor 122 from a wireless communication node 120. By analyzing environmental parameters, the UE can detect patterns and variations characteristic of specific geographical locations or environmental conditions. For example, the UE 110 might identify a particular set of environmental conditions that align with those currently recorded near the wireless communication node 120, supporting the location determined through signal analysis. If the UE 110 estimates that it is closest to a first wireless communication node, the UE 110 can compare the data from an environmental sensor of that first wireless communication node with its own environmental sensor data. If the environmental conditions, such as humidity or barometric pressure, are similar or within a certain threshold, this similarity can confirm the accuracy of the initial location analysis. Conversely, if the environmental data from the UE 110 and the first wireless communication node do not match or satisfy a threshold, the UE 110 can assume that the initial analysis may be incorrect and revise the estimate or consider additional factors to improve the accuracy of the location determination. In some cases, machine learning algorithms can enhance this process by correlating historical and real-time environmental data, allowing the UE 110 to refine its location estimation further.

The UE 110 can include a wireless transceiver 112 that enables it to send and receive information, such as to or from the CPS 130. For example, the UE 110, for example, scout UEs, can send connectivity data to the CPS 130. Frequent communication can be power-intensive as it may require the wireless transceiver 112 to be active, thereby consuming significant battery life and bandwidth. However, to reduce battery usage and reduce data consumption, the UE 110 can be configured to send updates according to a predetermined schedule, policy, or algorithm, or only under specific conditions. For example, a frequency-based schedule may dictate that UE 110 signals are communicated at specific intervals, such as such as every X seconds or minutes. As another example, the UE 110 may send connectivity information when certain conditions are satisfied, such as when the UE's location changes by a threshold amount or deviates from an expected location by a threshold amount.

The UE 110 can include a scout application 116 that operates responsive to a message from the CPS 130 that sends "scouts," for example, UEs having a scout application 116 thereon, to ping available networks 102 for a given account (customer) at the location where the UEs are used. The connectivity data gathered by the scout UEs can be used cooperatively to decide the best overall cell service provider based on network performance information. Over time, data pertaining to the quality of the network performance of the UEs 110 when connected to the CPS 130 via the various MVNEs can be obtained as will be discussed further herein.

For example, each UE 110 can send signals to available networks, for example, cellular or Wifi networks, to obtain data related to the connectivity thereof and provide this data to the CPS 130 to be analyzed. The CPS 130 can maintain an accurate record of each UE's connectivity and use this data to provide the overall best connectivity for the fleet.

In some cases, the UE 110 can receive environmental layout data via the wireless transceiver 112. For example, the UE 110 may receive environmental layout data from the CPS 130, from a wireless communication node 120, or have it preprogrammed. The environmental layout data can vary across embodiments. In some cases, the environmental layout data includes information that uniquely identifies each wireless communication node 120 and associates each wireless communication node 120 with a distinct location within a designated coverage area. For example, in a situation where the wireless communication nodes 120 are distributed across multiple floors within the multi-story building, the environmental layout data can include indications of a respective floor and area for each wireless communication node 120.

The UE 110 can include an alert system 115 to provide notifications to users about non-compliance events. The alert system 115 can generate various types of alerts, including audible messages, visual signals, or haptic feedback, to inform users when a UE 110 moves outside its designated area or fails to return to its home location. For example, if a UE 110 exits a predefined geo-fence, the alert system 115 can emit an audible alert to prompt the user to return the UE 110.

The alert system 115 can log events in the CPS 130, allowing administrators to review and analyze alert patterns. This logging capability can help identify recurring issues, such as UEs 110 frequently losing connection or having very long latency times. By analyzing these patterns, administrators can take proactive measures to address underlying problems and improve operational efficiency.

The alert system 115 can be configured to trigger notifications based on specific conditions, such as low battery levels or unauthorized movement. These notifications can be sent to administrators via email, SMS, or through a centralized dashboard, ensuring that potential issues are addressed promptly. In some cases, if a UE's 110 battery level drops below a certain threshold while it is outside its home location, the alert system 115 can send an alert to prompt the user to return the UE 110 for charging. By enhancing user awareness and prompting corrective actions, the alert system 115 helps maintain UE 110 accountability and supports effective fleet management.

The UE 110 may also include a plurality of SIMs 117 so that the UE 110 is multi-modal, i.e. can use more than one cellular provider for connectivity. The SIMs 117 may be actual SIM cards or soft SIMs without departing from the scope of the present inventive concept.

The device management system 100 can include a collection of wireless communication nodes 120 deployed throughout a designated coverage area. A designated coverage area may include various static or dynamic environments, including, but not limited to, retail environments, hospitality venues, corporate offices, educational institutions, single or multi-story buildings, distinct rooms, or floors, and indoor or outdoor settings, including mixed indoor and outdoor environments like campuses, hotels, or commercial centers. In some cases, a designated coverage area can range from a few hundred square feet (e.g., a small retail store) to several acres (e.g., a large hotel complex). In some cases, a designated coverage area can include a multi-story office building with thousands of square feet per floor, or an expansive university campus with numerous buildings and outdoor spaces.

Deployment of wireless communication nodes 120 within a designated coverage area can be guided by specific strategies tailored to the environment's characteristics and intended use. For example, a deployment strategy can include placing the wireless communication nodes 120 such that every point on a predetermined horizontal plane, such as ground level or eye level, within each location of the designated coverage area receives signals from at least one, two, or more wireless communication nodes 120. In more complex configurations, a deployment strategy ensures coverage throughout an entire three-dimensional space of the designated coverage area, covering both horizontal and vertical dimensions. In some such configurations, each vertical and horizontal location of the designated coverage area receives signals from at least one, two, or more wireless communication nodes 120. In some cases, a deployment strategy can include deploying nodes at strategic points, such as near staircases, elevators, or in common areas, to improve signal reach and effectiveness based on architectural layouts and expected user movement patterns.

The quantity of wireless communication nodes 120 within a designated coverage area can be scaled, for example, according to the complexity and size of the designated coverage area or the specific demands of the device management system 100. For example, in smaller, confined spaces such as single-floor retail stores, a few wireless communication nodes 120 (e.g., one or two for each room) may provide adequate coverage and accuracy. Conversely, for larger, more complex environments like hotels, multi-story office buildings or sprawling university campuses, the number of nodes can be significantly higher, potentially extending into the hundreds or thousands. In such cases, the strategic distribution of these wireless communication nodes 120 takes into account not only the vastness of the designated coverage area but also the architectural nuances that might affect signal transmission, such as walls, floors, or large obstacles.

Each wireless communication node 120 can include one or more components to support accurate location determination of a UE 110. These components can include, but are not limited to, a beacon 121 or an environmental sensor 122.

A beacon 121 can be configured to emit radio frequency (RF) signals, for example, using Bluetooth Low Energy (BLE) technology. In some cases, this emission enables the determination of the approximate location of the UE 110 within the designated coverage area by analyzing signals from this beacon 121 and/or other beacons 121 within the vicinity. For example, the beacon(s) 121 can broadcast signals that, when received by the UE 110, facilitate a triangulation process or proximity analysis, thereby facilitating the determination, by the UE 110 or by the CPS 130, of the relative location of the UE 110 within the designated coverage area covered by the beacon network. For example, by analyzing the strength (e.g., Received Signal Strength Indicator (RSSI)), direction (e.g., with technologies like Bluetooth 5.1's direction finding feature), time of flight, phase difference, or other signal characteristics of these signals from one or multiple beacons 121, the location of a particular UE 110 can be estimated relative to the beacons 121. Moreover, the beacons 121 are deployed in known fixed locations which allows a UE 110 to determine its location using its proximity to the beacons.

Although described generally as Bluetooth technology, alternative wireless technologies may also be utilized. Examples include wireless mesh devices operating under standards such as 802.15.4, and Internet-of-Things (IoT) devices. These devices can emit signals across multiple frequency ranges or utilize various wireless protocols, enhancing the network's ability to maintain robust and scalable communications within the designated coverage area.

In some cases, a beacon 121 can be configured to emit RF transmissions at multiple distinct power levels. For example, a beacon 121 can emit first RF transmissions at a first power level (e.g., −30 dBm) and second RF transmissions at a second power level (e.g., 0 dBm). In addition or alternative, a beacon 121 can be configured to emit RF transmissions at multiple frequencies. For example, in some cases, a beacon 121 can emit first RF transmissions at a first frequency (e.g., 2.4 GHz) and a second RF transmissions at a second frequency (e.g., 5 GHz). Emitting at multiple power levels and/or multiple frequencies can facilitate an improved analysis of signal characteristics, which can vary depending on the power level and/or frequency of the transmission. Variations in power levels and/or frequencies can affect the range and penetration of the RF signals. For example, higher power levels may penetrate walls or other objects more effectively than lower power levels. Lower power levels can be better suited for reducing interference and improving signal precision in densely populated areas or environments with many obstacles. Additionally, using multiple frequencies can help mitigate issues such as signal fading and multipath interference, providing a more reliable and accurate signal analysis. This variation introduces by emitting RF signals at multiple power levels or frequencies can provide more comprehensive data on signal attenuation, reflection, and/or interference, enhancing the accuracy of location determination and environmental mapping by allowing the UE 110 to better analyze signal behavior under different conditions. Furthermore, emit RF transmissions at multiple distinct power levels can provide redundancy, improving reliability of signal reception under varying conditions.

In some cases, the beacons 121 can transmit RF signals at intervals determined by predefined criteria. These beacon 121 RF transmissions, sometimes called "pulses", can be scheduled to occur at regular intervals, such as every X seconds or minutes, based on a predetermined schedule, policy, or algorithm. For instance, a frequency-based schedule may dictate that beacon signals are broadcasted at specific intervals to optimize detection and communication with the UE 110. In situations where the UE 110 does not receive an RF transmission of a beacon 121, the UE 110 can infer that it may not be in close proximity to that beacon 121. This lack of signal reception can enable the UE 110 to adjust its location estimation processes or analyze signals from alternative beacons 121 to refine its position within the designated coverage area. Such a mechanism can allow the UE 110 to continually update its location information based on the availability and strength of received beacon signals.

In some cases, a plurality of RF beacons 121 can be strategically placed around an area to define a geo-fence boundary. These RF beacons 121 can be positioned at specific, known locations (e.g., known to the CPS 130 and/or the UE 110), allowing for the precise creation of geographical boundaries. Each RF beacon 121 can emit signals that help establish the limits of compliance zones and non-compliance zones within the designated area. The signals from these beacons 121 may be monitored, enabling accurate tracking and management of movement of UEs 110 within and/or proximate to the geo-fence. In some cases, a geo-fence is defined by other methods such as GPS coordinates, Wi-Fi triangulation, or the use of physical landmarks or barriers.

An environmental sensor 122 can measure any of various parameters including, but not limited to, barometric pressure, temperature, humidity, light, sound levels, air quality, or electromagnetic field (EMF) strength. The environmental sensor 122 can include, but is not limited to, a barometric pressure sensor, a temperature sensor, a humidity sensor, a photodetector or light sensor, a sound or noise level meter, an air quality sensor, or an EMF meter. In some cases, in addition to the wireless communication node 120 including an environmental sensor 122, the UE 110 can also include an environmental sensor 122. In some such cases, the environmental sensor 122 of the UE 110 can be the same or similar to that of the environmental sensor 122 of the wireless communication node 120. In this way, the UE 110 can compare its environmental data with that of the wireless communication node 120, providing a factor to confirm or determine the location of the UE 110. In some cases, by comparing environmental conditions, the UE can verify and refine its proximity estimation.

In some cases, the environmental sensor 122 can include or more sensors configured to detect changes within their immediate surroundings, such as movement or the proximity of an object or individual. Such environmental sensors can include, but are not limited to, proximity or motion sensors. When these sensors detect changes, they generate data that can indicate the presence of an individual (potentially the user of the UE 110) within a specific proximity to the corresponding wireless communication node 120. Although possibly not conclusively verifying the specific location of the UE 110, this data can contribute an additional layer of information for location analysis. For example, it can be factored into the broader process of location determination, offering another dimension of evidence that supports the inference of the proximity of the UE 110 to a specific wireless communication node 120. This multi-faceted approach to gathering and analyzing data can serve to refine the overall capacity of the UE 110 for providing accurate location determinations.

In some instances, the beacon RF transmissions can include data indicative of environmental conditions, sourced from environmental sensor 122. By incorporating environmental sensor data into these RF transmissions, the beacon 121 can allow the UE 110 to gain insights into the surrounding environmental conditions. In some instances, environmental sensor data can be transmitted via signals other than RF transmissions.

The CPS 130 can manage and facilitate data exchanges between the UE(s) 110, the wireless communication node(s) 120, and/or itself. The CPS 130 can process and store connectivity data, for example, network connectivity information and latency information received from, for example, UE or scout UEs. The CPS 130 can further process and store location data, enabling real-time or near real-time location services through its interfaces with UEs and wireless communication nodes across multiple network protocols, ensuring efficient data transfer necessary for accurate location determination. The connectivity module 133 of the CPS 130 can use both connectivity data and location data together to determine the best connections to provide consistent and reliable connectivity to the UEs.

The CPS 130 can communicate bidirectionally with UEs to receive and/or transmit connectivity and location data, allowing the CPS 130 to maintain and update connectivity information related to positions of the UE 110 and maintain a dynamic map indicative of UE positions within the designated coverage area and their associated connectivity status/score.

The CPS 130 can implement an algorithm that sends the "scouts," for example, UEs having a scout application 116 thereon, to ping available cellular networks for a given account (customer) at the location where the UEs are used. The data gathered by the scout UEs can be used cooperatively to decide the best overall cell service provider based on network performance information. Over time, data pertaining to the quality of the network performance of the UEs when connected to the CPS 130 via the various MVNEs can be obtained as will be discussed further herein.

In particular, the data acquired by the scout UEs may be stored in the data repository 131 and used by the algorithm in the connectivity module 133 to "score" each MVNE's cellular connectivity. In other words, using the data 131, a score may be assigned to each MVNE and this score may be used in the process of selecting the appropriate network for the fleet. In some embodiments, the selected network may be used on a fleet-wide basis. In these embodiments, the MVNE that scores best overall may be set as the default cellular MVNE for the entire fleet. However, in some embodiments, rather than assign the entire fleet to the same MVNE, some UEs may be assigned to a different MVNE. For example, certain sections within a larger account location footprint may exhibit characteristics that show that one MVNE gets better results in the particular section of the location than the MVNE assigned to the fleet. In such scenarios, individual UEs 110 in that section may be switched to a different MVNE. This granular data may be linked to location provided by a set of, for example, Bluetooth beacons, in known locations as discussed herein.

Most any location in which a fleet of UEs 110 are deployed is likely to experience connectivity issues in certain areas, i.e. there will likely be dead spots for wireless fidelity (WiFi) and/or cell connectivity. The fleet of UEs associated with an account can be used to identify when and where a UE device 110 in the account location had connectivity issues. The UEs may track indoor location changes using, for example, Bluetooth beacons, and report data back to the CPS 130 including data related to message failure rates and offline duration. Layering this connectivity data on top of indoor locations is insightful to areas that have poor connectivity and, thus, negatively impact product usage. This data may then be used to identify problem areas that could be candidates for enhanced coverage. Enhanced coverage may include, for example, additional access points or Ranger locations.

The CPS 130 can support the operation of a Dashboard, an administrative tool used to manage and configure communication devices and user settings. This Dashboard can provide functionalities for visualizing connectivity data and real-time location data, monitoring user activity, and managing alerts. It can allow administrators to deploy and manage communication networks, ensuring device functionality and effective coordination of team members.

The CPS 130 can facilitate the functionality of an app, such as the client application 114 or scout application 116. In some such cases, the client application 114 can be implemented as a smartphone application designed for managers to oversee team communications. This client application 114 can support real-time messaging, alert sending, and location tracking of team members. The client application 114 can allow managers to communicate directly with their team, send instructions, and monitor activities. The scout application 116 can support collection of data related to UE connectivity and reporting the data to the CPS 130 for application to an algorithm to determine connectivity scores for the various connectivity modes.

The CPS 130 can include a data repository 131 for storing connectivity date, environmental layout data and/or location data relevant to UEs 110 of one or more designated coverage areas. For example, the data repository 131 can maintain data provided by the scout UEs and mappings that include unique identifiers and precise location data for each wireless communication node 120.

The CPS 130 can include a fleet management system 132 including a connectivity module 133. The fleet management system 132 including the connectivity module 133 can receive connectivity data, such as latency data, and use this data to provide connectivity scores to the various MVNEs 104. These scores can be used to decide which MVNE/network should be used for the fleet of UEs and which UEs should be connective to different MVNEs having higher performance in certain areas.

The fleet management system 132 can also process location data received from a UE 110 and wireless communication nodes 120, maintaining an accurate and up-to-date record of each UE's 110 position and operational status. When the UE 110 enters or exits a compliance zone and/or a non-compliance zone (e.g., a predefined geo-fence), the fleet management system 132 can log this event and update the UE's 110 status accordingly. Additionally, the fleet management system 132 can monitor battery levels, usage patterns, or operational status of the UEs 110.

The fleet management system 132 can generate detailed reports on UE 110 connectivity, usage, location history, or operational status. These reports can provide administrators with insights into the overall efficiency of the fleet, helping to identify patterns such as frequent connectivity issues in certain areas. By analyzing these reports, administrators can make informed decisions to optimize UE 110 connectivity, such as switching a particular area in the location to a different MVNE for connection.

The fleet management system 132 can facilitate real-time alerts and notifications based on predefined compliance zones. If a UE 110 moves outside its authorized area or fails to return to the docking system 140 within a specified time frame, the fleet management system 132 can trigger alerts to notify users of the UE 110 and/or administrators. These alerts can be configured to be sent through the UE 110 itself, or via email, SMS, or through a centralized dashboard, enabling quick response to potential issues. In some cases, the fleet management system 132 can distinguish between acceptable non-compliance events, such as scheduled breaks, and non-compliance events that may require immediate attention. By integrating these capabilities, the fleet management system 132 helps to reduce instances of lost or misplaced UEs 110 and enhances overall fleet management.

The fleet management system 132 can also support compliance monitoring by defining high-risk periods when non-compliance events are more likely to occur, such as the end of a worker's shift or entry into restricted areas. During these periods, the fleet management system 132 can escalate alerts to ensure prompt corrective actions. In this way, the fleet management system 132 can improve UE accountability and operational efficiency, increasing the likelihood that UEs 110 will be used properly and returned to their designated locations.

The docking system 140 can provide a designated home location for the fleet of UEs 110, offering a specific spot for charging and/or secure storage. When the UE 110 is placed in the docking system 140, the UE 110 can interact with the fleet management system 132 to confirm its presence and update its status to indicate it is charging. In some cases, the UE 110 performs this interaction directly. In other cases, the docking system 140 communicates with the fleet management system 132 to verify the docking status.

The docking system 140 can be implemented with specific hardware designed for secure device storage and charging. The docking system 140 may include charging connectors compatible with various types of the UE 110, LED indicators to show charging status, and secure locking mechanisms to prevent unauthorized removal. In some cases, the docking system 140 can be intelligent, equipped with communication modules to interface with the CPS 130. This intelligent docking system can send status updates, detect anomalies, or trigger alerts if the UE 110 is not docked correctly. In other cases, the docking system 140 may be a simpler, non-communicating unit, such as one that relies on physical interaction for status verification.

The docking system 140 can have different configurations to accommodate various operational needs. For example, the docking system 140 can be an RFID-enabled box that detects the presence of each UE 110 via its unique RFID tag. The docking system 140 can have specific compartments for each UE 110, ensuring that each device is placed in its designated spot. Alternatively, the docking system 140 can feature a communal compartment where multiple UEs 110 are stored together. In such a setup, the docking system 140, or the UE 110 itself, may verify the presence of each UE using unique IDs and update the fleet management system 132 accordingly.

The docking system 140 can contribute to location tracking by verifying when the UE 110 is seated in its docking system. This verification process can include recording the time a UE 110 was docked and undocked, providing administrators with a clear log of device usage and return patterns. If a UE 110 is not docked within a specified period, the docking system 140 can generate an alert to prompt a check on the UE's 110 status and location.

In some cases, the docking system 140 can be integrated with its own alert system 115 to enhance device management. In some such cases, if a UE 110 fails to return to its docking system within a designated time frame, the docking system 140 can trigger notifications to inform administrators. These notifications can include details such as the UE's 110 last known location, user assignment, and battery status, enabling timely interventions to locate and return the UE 110. By providing a reliable and organized method for managing device returns and charging, the docking system 140 supports the readiness and accountability of the fleet.

Figure 2:
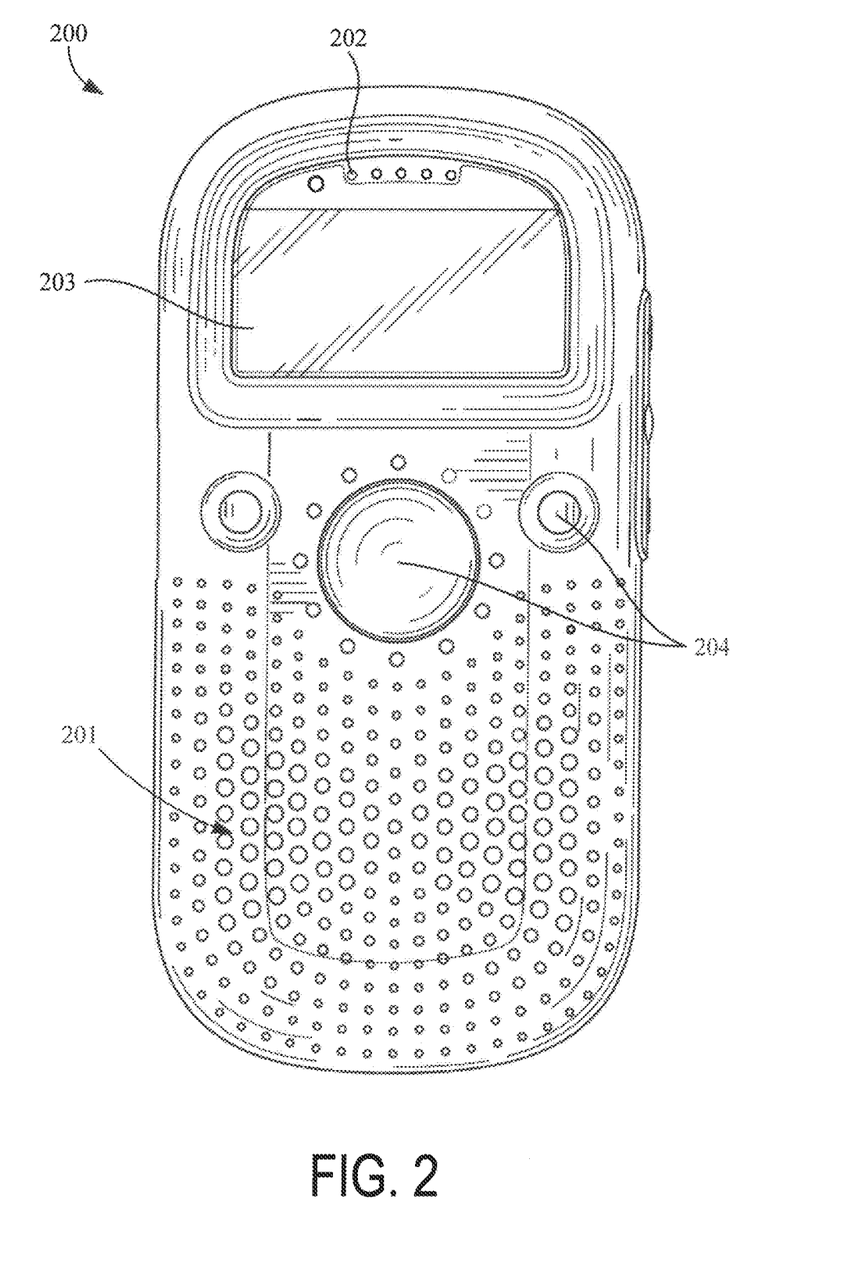
FIG. 2 is a diagram illustrating an example of a UE in accordance with some embodiments of the present inventive concept.

FIG. 2 depicts an example of a UE 200, according to some embodiments of the inventive concepts. It will be appreciated that the UE 200 may be an embodiment of the UE 110 of FIG. 1. As described herein, the UE 110 can be configured to support communication and operational functionalities across diverse industries. For example, the UE 200 can facilitate two-way communication, location tracking, and/or real-time data exchange.

The UE 210 can be designed with a compact and durable form factor, suitable for use in environments that demand robust handling and frequent use. The UE 200 can include a speaker 201, microphone 202, a display screen 203, a device interface (not shown) for coupling with external accessories such as, for instance, a headset, and a user interface that may include buttons 204 and/or a touchscreen component of the display screen 203.

Consider a scenario in a hotel environment where a collection of UE 200 devices is deployed and distributed among the housekeeping staff of a hotel. Each housekeeper can be assigned specific hotel rooms as part of their daily cleaning rounds. The individual UE 200 devices enable housekeepers to communicate with each other, allowing them to coordinate tasks efficiently, request supplies, or call for assistance when needed. Furthermore, the connectivity of each UE 200 can be monitored.

The quality of service (QOS) provided by each MVNE to MVNE may vary widely regardless of cell provider even if separate MVNEs utilize the same MNO. In some embodiments, connection quality may be measured based on the time it takes a network to get up and running (connection establishment latency). A connection (network) uptime metric, may be calculated as the ratio of connected uptime to disconnected downtime across, for example, 365 days, which may then be expressed as a percentage. Services that achieve uptime metrics in the range of, for example, 99 percent or above can be considered as having good connection metrics. To achieve 99 percent the network must be connected (up) 361.35 days per year. Network latency is the delay in network communication. Latency shows the time that data takes to transfer across the network. Networks with a longer delay or lag are said to have "high latency," while those with fast response times are said to have "low latency."

The individual UE devices 200 provide connectivity data to the CPS 130 and is used by an algorithm to "score" each MVNE's cellular connectivity. The score may be used to decide which UEs 200 in the hotel environment will be assigned to which MVNE. In some embodiments, the entire fleet of UEs 200 in the hotel environment will be assigned to the MVNE that scores best overall. In other embodiments, certain sections of the hotel environment may exhibit characteristics that show that one MVNE gets better results in a section of the location than another MVNE. In such scenarios, individual UEs in that section of the hotel environment may be switched to a different MVNE. This granular data may be linked to location provided by a set of, for example, Bluetooth beacons, in known locations.

Thus, hotel management can monitor the connectivity of the UEs via, for example, a Dashboard, ensuring that all UEs are able to reliably connect to the network in all areas of the hotel environment. This connectivity data and resulting connectivity scores may be used to determine if certain portions of the hotel environment should be switched to a different MVNE due to frequent issues of connectivity from these areas. The connectivity data/score may be layered on top of location data and may provide more insight to areas that have poor connectivity and, thus, negatively impact product usage. This data may then be used to identify problem areas that could be candidates for enhanced coverage. Enhanced coverage may include, for example, additional access points or Ranger locations.

Figure 3:
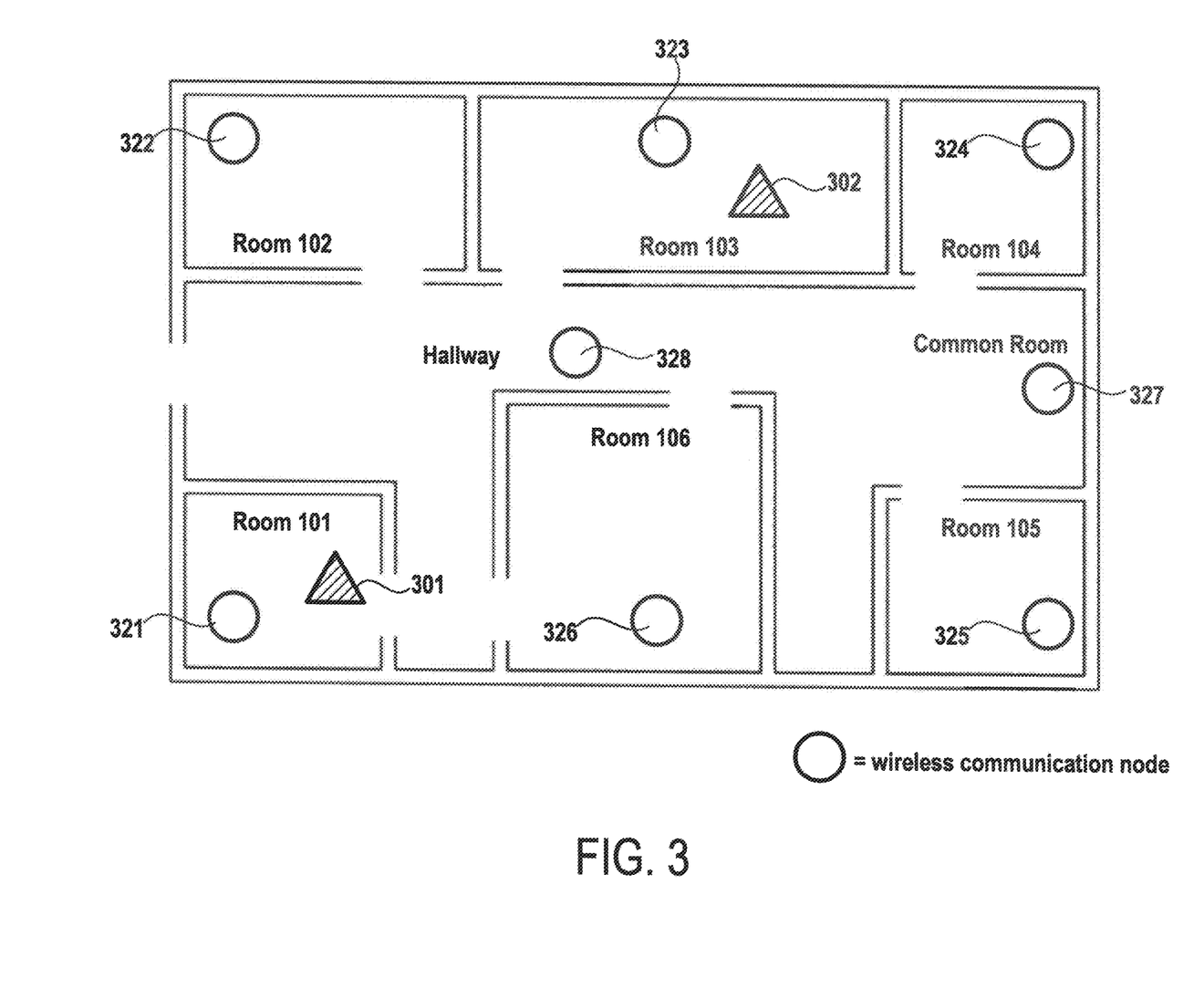
FIG. 3 illustrates an example floor plan displaying example placement of wireless communication nodes within a first-floor building layout.

FIG. 3 illustrates a floor plan illustrating embodiments using both connectivity data and location data to select one or more MVNEs for communication within an environment. In particular, the floor plan displays example placement of wireless communication nodes 321, 322, 323, 324, 325, 326, 327 within a first-floor building layout. The wireless communication nodes, indicated by circles, are distributed across various rooms and common areas to improve location determination capabilities of the UEs 301 and 302. In this example, Rooms 101, 102, 103, 104, 105, and 106, as well as the common room 107 and hallway 108, are each equipped with one wireless communication node. Though each room is depicted as having one corresponding wireless communication node, it will be appreciated that, in some cases, a room may have no wireless communication nodes, or may have more than one. In some cases, the wireless communication nodes are distributed throughout the floor layout such that each location of the designated coverage area (i.e., the floor plan) receives signals from at least two wireless communication nodes 120. Each of the UEs 301 and 302 may ping available cellular networks for a given account (customer) at the location where the UEs 301 and 302 are used. The data gathered by the UEs 301 and 302 are sent to the CPS 130 and used cooperatively to decide the best overall cell service provider based on network performance information. Over time, data pertaining to the quality of the network performance of the UEs when connected to the CPS 130 via the various MVNEs can be obtained.

Most any location in which a fleet of UEs are deployed is likely to experience connectivity issues in certain areas, i.e. there will likely be dead spots for wireless fidelity (WiFi) and/or cell connectivity. The fleet of UEs associated with an account can be used to identify when and where a UE device in the account location had connectivity issues. As illustrated in FIG. 3, the UEs 301 and 302 may track indoor location changes using, for example, Bluetooth beacons, and report data back to the CPS 130 including connectivity data, i.e. data related to message failure rates and offline duration. Layering this connectivity data on top of indoor locations is insightful to areas that have poor connectivity and, thus, negatively impact product usage. This data may then be used to identify problem areas that could be candidates for enhanced coverage. Enhanced coverage may include, for example, additional access points or Ranger locations.

Figure 4:
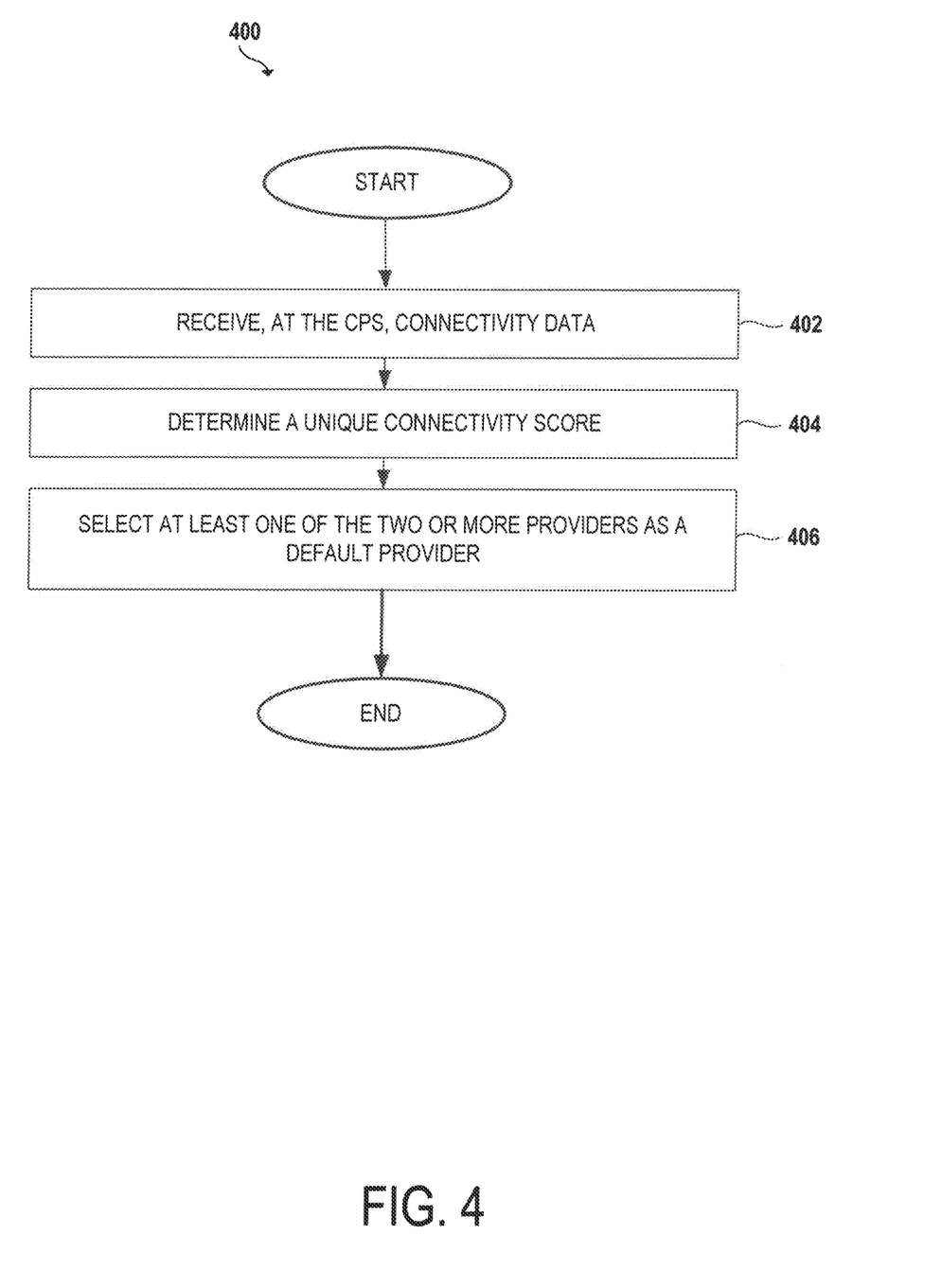
FIG. 4 is flowchart illustrated operations for providing consistent and reliable connectivity to UEs in accordance with some embodiments of the present inventive concept.

Referring now to FIG. 4, a flowchart 400 illustrating operations for providing consistent and reliable connectivity to a fleet of UEs in accordance with some embodiments of the present inventive concept will be discussed. Embodiments of the present inventive concept provide methods for managing a plurality of UEs, where the UEs are part of a system communicable with the CPS over an IP network. The UEs are configured to transmit connectivity data associated with geographical positions with a designated coverage area to the CPS. Operations begin at block 402 by receiving, at the CPS, connectivity data associated with two or more providers from each of a plurality of UEs operational in a designated coverage area. As illustrated, for example, in FIG. 1, the CPS 130 may include a data repository where the connectivity data may be stored. In some embodiments, the connectivity data may at least include an amount of time it takes for a UE to connect to the network (connectivity establishment latency) and a delay in connecting the UE to the network (latency). Some embodiments may also measure and/or track the frequency of disconnects, round trip time (ms), any variance of round-trip time, signal strength, valid connections, an ability to transmit information, throughput and the like.

In some embodiments, the CPS may deploy "scout" UEs to ping all available networks for a given company (account) in the designated coverage area and provide the resulting connectivity data back to the CPS. It is understood that the connectivity data may be associated with a geographical position of the scout UEs within the designated coverage area. The geographical position of the UE when it provides the connectivity data is relevant as not all sections of the designated coverage area will have the quality of service from all providers. Thus, some UEs may have better service on one providers' network than other UEs. Providing the location with connectivity data allows "dead spots" in the network to be identified.

Once the connectivity data is collected across the fleet of UEs, a unique connectivity score that indicates a quality of service provided by each of the providers is determined (calculated) based on the connectivity data received from each of the plurality of UEs (block 404). This "fitness" score provides data associated with the performance of each provider in all areas of the designated coverage area. In some embodiments, a higher score indicates better performance. Using the unique connectivity scores, at least one of the providers may be selected as a default provider for the all of the UEs in the designated coverage area based on the determined unique connectivity scores (block 406).

It will be understood that fewer, more, or different blocks can be used as part of the routine 400 of FIG. 4. For example, in some cases, one, some, or all of the blocks may be performed by the CPS 130, rather than by the UE 110 itself. In certain embodiments, one or more of the blocks may be combined or performed concurrently. In some embodiments, certain steps may be omitted.

As discussed above and illustrated in FIG. 1, the system may include MVNEs. The MVNEs enable access to the providers therethrough. Thus, in these embodiments, the unique connectivity score may indicate the quality of service provided by each of the plurality of MVNEs based on the connectivity data received from each of the plurality of UE and the MVNE having the highest score may be selected as the default MVNE for the designate coverage area.

Although a single MVNE may be selected for the entire designated coverage area, embodiments of the present inventive concept are not limited thereto. For example, in some embodiments, the designated coverage area may be divided into a plurality of sections. As discussed above, some sections of the designated coverage area may have better coverage than other areas by a single MVNE. In these embodiments, different MVNEs may be assigned to provide service in each of the plurality of sections of the designated coverage area based on the unique connectivity score of each of the MVNEs in the each of the plurality of sections.

As further discussed above, the UEs discussed herein are multi-modal and, thus, are configured to operate with more than one provider. For example, a single UE may include multiple SIM cards, soft or hard. In some embodiments, a UE may be configured to select which MVNE to use in real time based on the unique connectivity scores associated with the MVNEs. Furthermore, in some embodiments, a message may be sent via alternate methods at the same time. Thus, the multiple SIMs may be active at the same time, and both may maintain connections. However, methods that send the messages over multiple connections at the same time may be more expensive and may drain the battery of the device faster.

Embodiments of the present inventive concept may repeat steps 402-406 periodically. Thus, the unique connectivity scores for each of the plurality of MVNEs may be periodically determined based on the connectivity data periodically received from each of the plurality of UEs. The selected MVNE set as the default provider for the plurality of UEs in the designated coverage area may be changed to a different MVNE when the unique connectivity score associated with the selected MVNE is determined to be below a predetermined threshold and another MVNE may provide better service.

In some embodiments, layout data for a collection of wireless communication nodes deployed throughout the designated coverage area may be stored in an environmental layout. The environmental layout data may include information that uniquely identifies each wireless communication node and associates each wireless communication node with a distinct location within the designated coverage area. The unique connectivity score indicating the quality of service provided by each of the plurality of MVNEs may be stored for each of the distinct locations within the designated coverage area. Storing this data together may allow dead spots in the networks to be identified.

As discussed briefly above, some embodiments of the present inventive concept provide methods that help maintain connectivity in a designated environment. By using connectivity data provided by the UEs, each provider's network may be assessed and scored and the best network for the situation may be selected.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may include, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A method for managing a plurality of user equipments (UEs), wherein the UEs are part of a system communicable with a communication platform server (CPS) via one of a plurality of mobile network operators (MNOs) communicable with an Internet Protocol (IP) network, the UEs configured to transmit connectivity data associated with locations within a designated coverage area, the method comprising:

maintaining, for each UE, an active registration with two or more MNOs;
receiving, at the CPS, connectivity data associated with two or more MNOs from each of a plurality of UEs operational in a designated coverage area, the connectivity data being associated with a location of each of the plurality of UEs within the designated coverage area;
determining a unique connectivity score that indicates a quality of service provided by each of the two or more MNOs based on the connectivity data received from each of the plurality of UEs; and
selecting at least one of the two or more wireless service providers MNOs as a default MNO for the plurality of UEs in the designated coverage area based on the determined unique connectivity scores.

2. The method of claim 1, wherein the system further comprises a plurality of mobile virtual network enablers (MVNEs) and wherein access to the two or more MNOs is enabled using the plurality of MVNEs, the method further comprising:
determining a unique connectivity score indicating the quality of service provided by each of the plurality of MVNEs based on the connectivity data received from each of the plurality of UEs; and
selecting at least one of the plurality of MVNEs as a default MVNE for the plurality of UEs in the designated coverage area based on the determined unique connectivity scores.

3. The method of claim 2, further comprising selecting a single MVNE having a best unique connectivity score to provide wireless service to all of the plurality of UEs in the designated coverage area.

4. The method of claim 2, wherein the designated coverage area is divided into a plurality of sections, the method further comprising selecting different MVNEs to provide wireless service in each of the plurality of sections of the designated coverage area based on the unique connectivity score of each of the MVNEs in the each of the plurality of sections.

5. The method of claim 2, wherein each of the plurality of UEs is multi-modal and is configured to operate with more than one MNO.

6. The method of claim 5, further comprising selecting an MVNE for at least some of the plurality of UEs in real time based on the unique connectivity score of the plurality of MVNEs.

7. The method of claim 2, wherein the connectivity data comprises at least an amount of time it takes for a UE to connect to the network and a delay in connecting the UE to the network.

8. The method of claim 7, further comprising:
periodically determining the unique connectivity scores for each of the plurality of MVNEs based on the connectivity data periodically received from each of the plurality of UEs; and
switching the selected at least one MVNE set as the default MNO for the plurality of UEs in the designated coverage area to a different MVNE when the unique connectivity score associated with the selected MVNE is determined to be worse than the unique connectivity score associated with different MVNE.

9. The method of claim 2, further comprising:
storing environmental layout data for a collection of wireless communication nodes deployed throughout the designated coverage area, wherein the environmental layout data comprises information that uniquely identifies each wireless communication node and associates each wireless communication node with a distinct location within the designated coverage area; and
storing the unique connectivity score indicating the quality of service provided by each of the plurality of MVNEs for each of the distinct locations within the designated coverage area.

10. A system comprising:
a communication platform server (CPS);
one or more user equipments (UEs) communicable with the CPS, each UE being multi-modal and including one or more RF transmitters and a global positioning system (GPS) module;
a plurality of RF beacons placed about an area configured to define a geo-fence boundary for the one or more UEs wherein a specific location of each RF beacon is known to the CPS,
wherein the system:
maintains, for each UE, an active registration with two or more MNOs;
receives, at the CPS, connectivity data associated with two or more mobile network operator (MNOs) from each of the one or more UEs operational in a designated coverage area, the connectivity data being associated with a location of each of the one or more UEs within the designated coverage area;
determines a unique connectivity score that indicates a quality of service provided by each of the two or more MNOs based on the connectivity data received from each of the one or more UEs; and
selects at least one of the two or more MNOs as a default MNO for the one or more UEs in the designated coverage area based on the determined unique connectivity scores.

11. The system of claim 10, further comprising a plurality of mobile virtual network enablers (MVNEs); wherein access to the two or more MNOs is enabled using the plurality of MVNEs and wherein the CPS:
determines a unique connectivity score indicating the quality of service provided by each of the plurality of MVNEs based on the connectivity data received from each of the plurality of UEs; and
selects at least one of the plurality of MVNEs as a default MVNE for the plurality of UEs in the designated coverage area based on the determined unique connectivity scores.

12. The system of claim 11, wherein the CPS further selects a single MVNE having a best unique connectivity score to provide wireless service to all of the plurality of UEs in the designated coverage area.

13. The system of claim 11, wherein the designated coverage area is divided into a plurality of sections and wherein the CPS selects different MVNEs to provide wireless service in each of the plurality of sections of the designated coverage area based on the unique connectivity score of each of the MVNEs in the each of the plurality of sections.

14. The system of claim 11, wherein each of the plurality of UEs is multi-modal and is configured to operate with more than one MNO.

15. The system of claim 14, where the CPS further selects an MVNE for at least some of the plurality of UEs in real time based on the unique connectivity score of the plurality of MVNEs.

16. The system of claim 11, wherein the connectivity data comprises at least an amount of time it takes for a UE to connect to the network and a delay in connecting the UE to the network.

17. The system of claim 16, wherein the CPS further:
periodically determines the unique connectivity scores for each of the plurality of MVNEs based on the connectivity data periodically received from each of the plurality of UEs; and
switches the selected at least one MVNE set as the default MNO for the plurality of UEs in the designated coverage area to a different MVNE when the unique connectivity score associated with the selected MVNE is determined to be worse than the unique connectivity score associated with different MVNE.

18. The system of claim 2, wherein the CPS further:
stores environmental layout data for a collection of wireless communication nodes deployed throughout the designated coverage area, wherein the environmental layout data comprises information that uniquely identifies each wireless communication node and associates each wireless communication node with a distinct location within the designated coverage area; and
stores the unique connectivity score indicating the quality of service provided by each of the plurality of MVNEs for each of the distinct locations within the designated coverage area.

19. A non-transitory computer-readable medium storing instructions that, when executed by a processor of a user equipment (UE), perform a method for managing a plurality of user equipments (UEs), wherein the UEs are part of a system communicable with a communication platform server (CPS) via one of a plurality of mobile network operators (MNOs) communicable with an Internet Protocol (IP) network, the UEs configured to transmit connectivity data associated with locations with a designated coverage area, the method comprising:
maintaining, for each UE, an active registration with two or more MNOs;
receiving, at the CPS, connectivity data associated with two or more MNOs from each of a plurality of UEs operational in a designated coverage area, the connectivity data being associated with a location of each of the plurality of UEs within the designated coverage area;
determining a unique connectivity score that indicates a quality of service provided by each of the two or more MNOs based on the connectivity data received from each of the plurality of UEs; and
selecting at least one of the two or more MNOs as a default MNO for the plurality of UEs in the designated coverage area based on the determined unique connectivity scores.

20. The non-transitory computer-readable medium of claim 19, wherein the system further comprises a plurality of mobile virtual network enablers (MVNEs) and wherein access to the two or more MNOs is enabled using the plurality of MVNEs, the method further comprising:
determining a unique connectivity score indicating the quality of service provided by each of the plurality of MVNEs based on the connectivity data received from each of the plurality of UEs; and
selecting at least one of the plurality of MVNEs as a default MVNE for the plurality of UEs in the designated coverage area based on the determined unique connectivity scores.

21. The non-transitory computer-readable medium of claim 20, the method further comprising selecting a single MVNE having a best unique connectivity score to provide wireless service to all of the plurality of UEs in the designated coverage area.

22. The non-transitory computer-readable medium of claim 20, wherein the designated coverage area is divided into a plurality of sections, the method further comprising selecting different MVNEs to provide wireless service in each of the plurality of sections of the designated coverage area based on the unique connectivity score of each of the MVNEs in the each of the plurality of sections.

23. The non-transitory computer-readable medium of claim 20, wherein each of the plurality of UEs is multimodal and is configured to operate with more than one MNO.

24. The non-transitory computer-readable medium of claim 23, wherein the method further comprises selecting an MVNE for at least some of the plurality of UEs in real time based on the unique connectivity score of the plurality of MVNEs.

25. The non-transitory computer-readable medium of claim 20, wherein the connectivity data comprises at least an amount of time it takes for a UE to connect to the network and a delay in connecting the UE to the network.

26. The non-transitory computer-readable medium of claim 25, wherein the method further comprises:
periodically determining the unique connectivity scores for each of the plurality of MVNEs based on the connectivity data periodically received from each of the plurality of UEs; and
switching the selected at least one MVNE set as the default MNO for the plurality of UEs in the designated coverage area to a different MVNE when the unique connectivity score associated with the selected MVNE is determined to be worse than the unique connectivity score associated with different MVNE.

27. The non-transitory computer-readable medium of claim 20, wherein the method further comprises:
storing environmental layout data for a collection of wireless communication nodes deployed throughout the designated coverage area, wherein the environmental layout data comprises information that uniquely identifies each wireless communication node and associates each wireless communication node with a distinct location within the designated coverage area; and
storing the unique connectivity score indicating the quality of service provided by each of the plurality of MVNEs for each of the distinct locations within the designated coverage area.

\* \* \* \* \*